ably small decrease in train pressure.
UNITED STATES PATENT OFFICE.

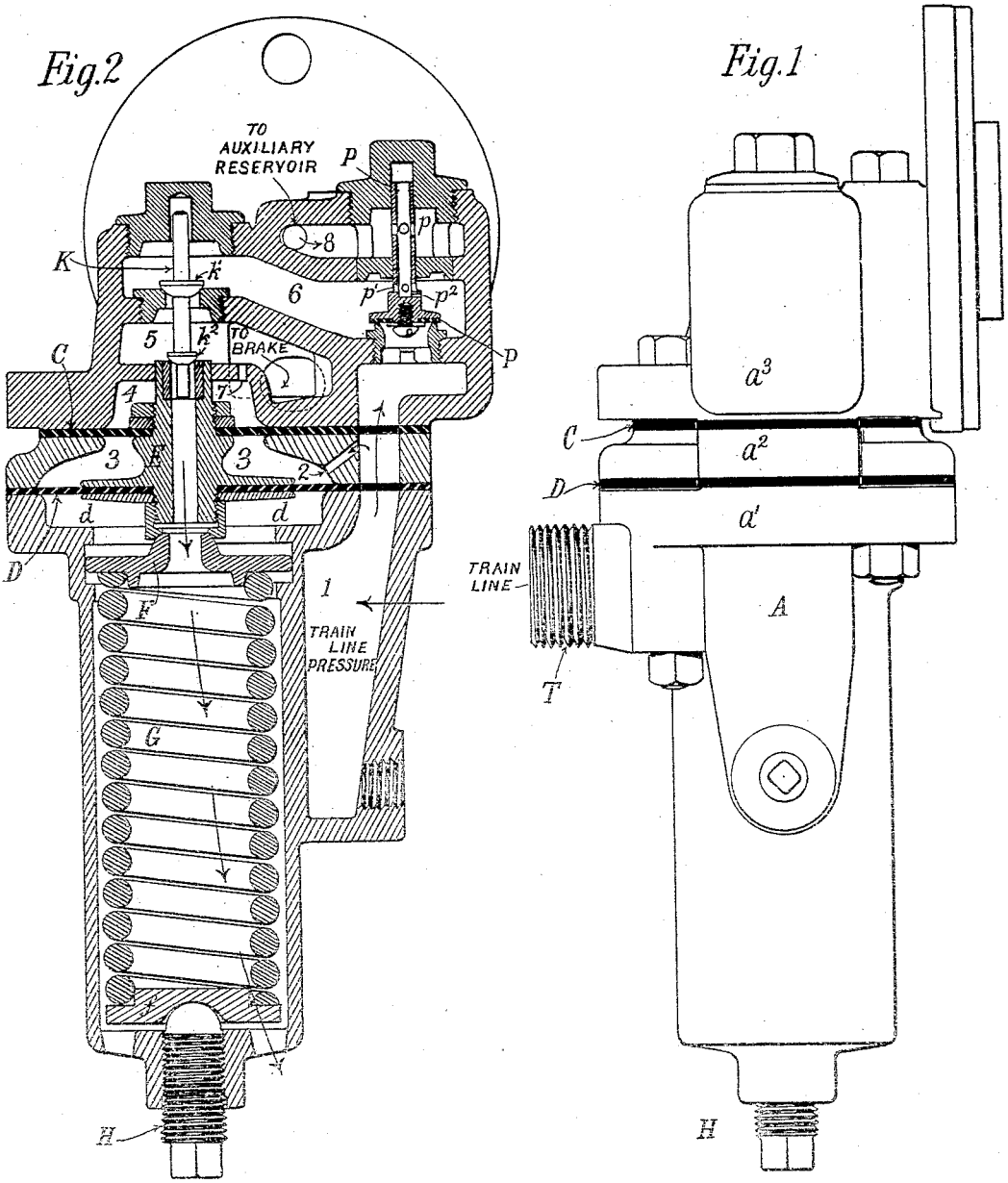

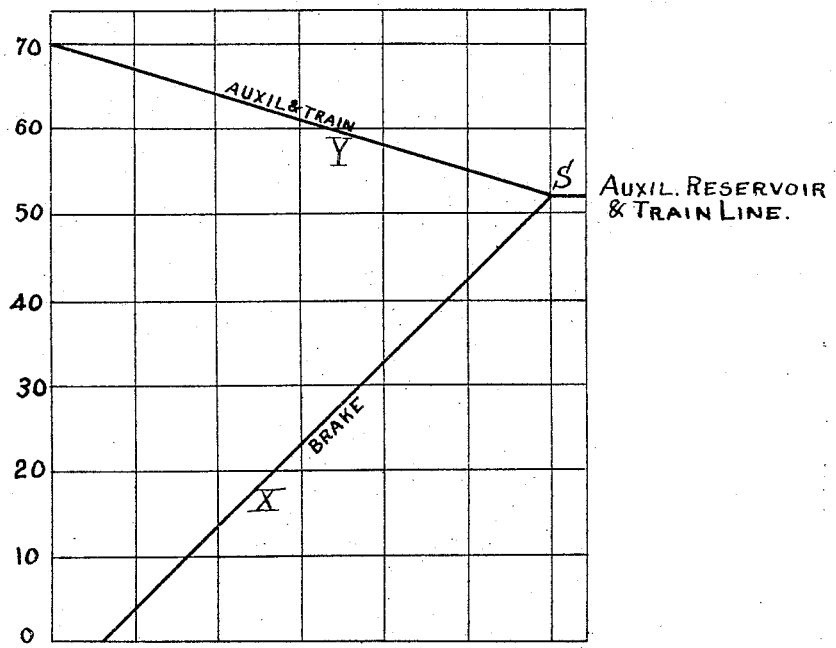
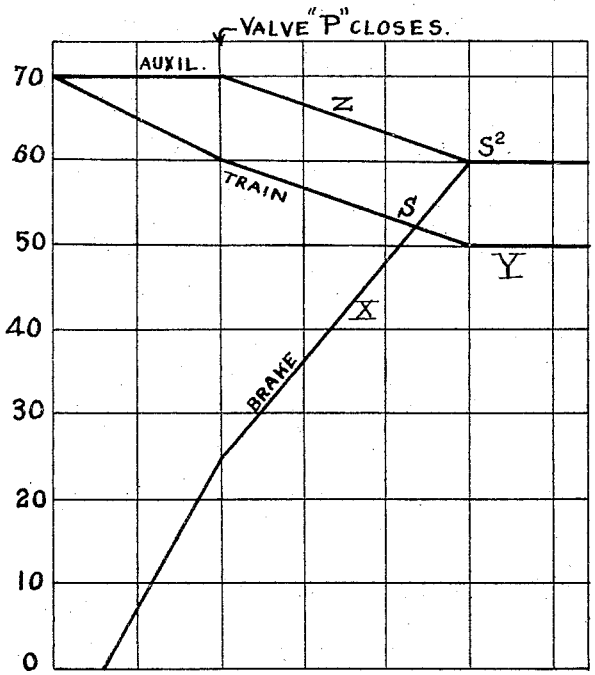

JAMES F. McELROY, OF ALBANY, NEW YORK, ASSIGNOR TO CONSOLIDATED CAR HEATING COMPANY, A CORPORATION OF WEST VIRGINIA.

AIR-BRAKE.

962,517.  Specification of Letters Patent.  Patented June 28, 1910.

Application filed February 25, 1907. Serial No. 359,215.

*To all whom it may concern:*

Be it known that I, JAMES F. MCELROY, a citizen of the United States, residing at Albany, in the county of Albany, State of New York, have invented certain new and useful Improvements in Air-Brakes; and in the accompanying drawings and specification I have shown and described as an illustration that form of my invention which I regard as the best one of the various forms in which its principles may be embodied.

In the drawings Figure 1 is a side elevation of a triple valve embodying my invention, Fig. 2 is a central vertical section thereof taken at right angles to the elevation of Fig. 1, Fig. 3 is a diagram illustrating the relation of pressures in a Westinghouse brake, Fig. 4 is a diagram illustrating the relation of pressures in my brake.

My invention relates to certain improvements in air brakes of the general type shown in my Patent No. 768,537 of August 23, 1904, which type is characterized by the fact that the amount of air admitted to each brake cylinder is measured and determined by the attained pressure in the brake cylinder itself, as distinguished from systems in which the amount is measured and determined by a balance of the train-pipe pressure against the auxiliary-reservoir pressure. The desired pressure in the brake cylinder in my type of brake is also directly and constantly under the control of the engineer, following, according to a predetermined law, the train-line pressure, which the engineer can set at any desired point.

The characteristic features of the aforesaid type of brake are secured by placing the inlet and exhaust valves of the brake cylinder under the control of a pressure which is a resultant of three component pressures, to-wit, (1) the brake-cylinder pressure, (2) the train-line pressure and (3) a standard pressure. Moreover, the point of opening or closing of the exhaust valve practically coincides with the point of the closing or opening of the inlet valve, so that any degree of pressure (to-wit the resultant of the three component pressures just mentioned) will mark the closing of both valves and the slightest departure therefrom will open one valve, leaving the other closed. In my type of air brake aforesaid, it is important that, in combining the three component pressures aforesaid, the train-pipe pressure should have a considerable mechanical advantage over the brake-cylinder pressure, acting, for example, on a piston or diaphragm of a larger area than the one acted on by the brake cylinder pressure. By this means the increased brake pressure does not follow directly the decrease of train-pipe pressure, but follows it according to a law dependent upon the relative areas of the two pistons or their mechanical relation. By this means a large increase in brake pressure corresponds to a comparatively small decrease in train pressure.

In the general operation of my type of brake the engineer is provided with means whereby he may produce any desired degree of pressure in the train pipe. Since it is not necessary in this type of brake to release the brakes in order to charge the auxiliary reservoir, and since such a brake-release and re-charging of the auxiliary reservoir is not required in order to pass from a lower to a higher degree of train-pipe pressure, I am enabled to provide the engineer with a form of valve whereby the mere movement of the handle to any desired point will be followed automatically by a maintained train-pipe pressure of a degree corresponding to the position of the handle, it being immaterial whether the handle is moved from a point of lower pressure to a point of higher pressure or vice versa. This type of brake is, however, workable with ordinary Westinghouse brakes and with the means employed therewith for controlling the train-pipe pressure. Assuming that the train-pipe pressure is thus under the control of the engineer, such pressure is, in my type of brake, balanced against the standard pressure, which is preferably a spring, while the spring pressure is also opposed by the pressure in the brake cylinders. Therefore, neglecting for a moment the train-pipe pressure and assuming that air is entering the brake cylinder, such air will continue to flow into the cylinder until a pressure is reached therein which will balance the spring pressure and the inlet-valve will then close. Since, however, the spring is opposed by the train-pipe pressure, the latter serves, so to speak, as a means of adjusting the tension of the spring and thereby determining the point at which equilibrium will be restored between the spring pressure and the brake-cylinder pressure. If the train-pipe pressure is at its maximum, the inlet valve will be closed and the exhaust valve open, but a decrease in train-pipe pressure will allow the spring to close the exhaust valve and open the inlet valve, thus allowing the air to enter the brake cylinder, until the pressure therein is sufficient to balance the spring pressure, when, as already stated, the inlet valve will close and the exhaust valve remain unopened. This will give a brake pressure determined by the degree to which the train-pipe pressure has been reduced, while a further reduction will again allow the spring to open the inlet valve and permit a further flow of air to the brake-cylinder until the pressure therein once more balances the new degree of spring-pressure. Conversely, an increase of train-pipe pressure will compress the spring which will open the exhaust valve and reduce the brake-cylinder pressure to a point where it will balance the now decreased spring pressure. In this way the brake-cylinder pressure may be determined at any time by the train-line pressure.

Bearing in mind the foregoing explanation of the type of brake to which my present invention relates, the character of that invention may be readily understood.

My invention consists, first, in certain arrangements by which, on the opening of the inlet valve of the brake cylinder there is a preliminary air-flow from the train pipe to the cylinder preceding a flow thereto from the auxiliary reservoir. Moreover, the proportionate amount of this preliminary train-pipe air increases rapidly with the suddenness and degree to which the brakes are applied. Thus such preliminary flow forms a small percentage of the entire flow when the brakes are lightly applied, but a larger percentage when the brakes are applied hard and suddenly. By this means the same apparatus serves both for "service" applications and "emergency" applications. There is no special feature of construction reserved for emergency use which is brought into the operation only when an emergency application is made.

My improvement also contemplate so relating the capacity of the auxiliary reservoir with respect to the brake-cylinder capacity that they will equalize, when put into free communication with each other at a point of pressure higher than the train-line pressure. This is in contrast to the ordinary Westinghouse system wherein the corresponding equalizing of auxiliary-reservoir and brake-cylinder pressures occurs at a point just equal to the train-line pressure.

Finally I intend to claim herein various features of construction which will be described later.

Referring to Fig. 1 of the accompanying drawing, A represents a casting constituting the body of what may be called my "triple valve," which is constructed so as to be attached directly to the auxiliary reservoir, according to common practice. It is also interchangeable with standard triple valves of the Westinghouse type and may be substituted therefor. The interior of this casting is shown in Fig. 2. The train-line air, entering through the nipple T (Fig. 1) passes into the chamber 1 and goes thence by the opening 2 into the space 3 between the two diaphragms C and D. These diaphragms are interposed between the sections $a'$, $a^2$ and $a^3$ of the casting A, the casting being—so to speak—sliced across and the diaphragm D interposed between the parts $a'$ and $a^2$ and diaphragm C between the parts $a^2$ and $a^3$. This simplifies the construction and makes it easy to open up the interior of the structure and replace the diaphragms and other elements of the apparatus and also renders the assembling and adjustment equally simple. The diaphragms are held in place by the bolts which pass through and hold the three sections of the casting together, and they are also perforated where they traverse the aforesaid chamber 1. The air pressure between the two diaphragms acts upwardly against a comparatively small area on the diaphragm C and acts downwardly against a much larger area on the diaphragm D. A correspondingly small area on the upper side of diaphragm C is acted upon, as will be hereinafter shown, by the brake cylinder pressure, and this difference in area produces the differential effect I have already described of the train-line pressure over the brake cylinder pressure when they both act against the standard pressure. It is this differential effect which enables a given range of variation in brake pressure to be secured by a lesser range of variations in the train-line pressure.

The two diaphragms C and D are connected by a hollow central stem E which at its lower extremity bears upon a disk F, being seated on the disk through a spherical joint while the disk itself has its edges also formed as segments of a spherical surface so that it may play freely with respect to the stem E and also with respect to the walls of the recess in the casting in which it is contained. This spherical joint centers the diaphragm casting and its center tends to move up and down in a vertical line. The disk F rests upon the spring G, which, in turn, rests upon a disk $f$ that bears on the semispherical tip of the screw H. By this arrangement the tension of the spring is applied to the diaphragm without exerting any twisting or warping pressure thereon. I also provide stops $d$, $d$ by which the upper range of the spring is limited. Since these stops are on the spring-case, I am enabled to compress the spring within the case and have it held under its adjusted tension independently of the connection of the spring-case with the other points. I can therefore remove the case and apply it to another triple or provide adjusted springs applicable to any triple. The upper end of the central or axial opening through the stem E is closed by the valve $k^2$ on the valve stem K, the under surface of the valve being spherical, so as to be unaffected in its opening and closing action by any possible twisting action in the vertical play of the diaphragm stem E.

Above the diaphragm C is a chamber 4 in communication by passageway 7 with the brake cylinder. By this arrangement the brake-cylinder pressure is applied to the upper side of the diaphragm C. Above the chamber 5 is an intermediate chamber 6, the connection between chambers 5 and 6 being controlled by the spherical valve $k'$ on the stem K. This intermediate chamber 6 is usually in communication with the auxiliary reservoir and receives the pressure therefrom, but during the application of the brake, particularly an emergency application, it also receives the train-line pressure, as will be hereinafter described.

It will be observed that the valve $k'$ is the inlet valve for the brake cylinder admitting thereto the pressure from the auxiliary reservoir via chamber 6 and also, under the conditions just mentioned, from the train-line too, whereas the valve $k^2$ is the exhaust valve for the brake cylinder and when opened allows the pressure from the cylinder to escape through the central or axial opening in the diaphragm-stem E and thence through the chamber containing the spring G to the external atmosphere through openings in the lower portion of the said chamber. This arrangement of the exhaust through the spring-containing chamber serves as a muffler for the exhaust. It should also be particularly observed that the valves $k'$ and $k^2$ are both rigidly mounted on the valve stem K, the result being that the valve $k'$ can only be opened by the rising of the diaphragm stem E which however must first close the valve $k^2$ before it can lift and open the valve $k'$. Conversely, the valve $k^2$ can only be opened by the depression of the diaphragm-stem E which must first allow the valve $k'$ to be seated and closed before it drops away from and opens the valve $k^2$. This arrangement of the two valves to act in tandem insures their operation at practically one and the same standard pressure afforded by the spring G. Assuming both valves to be closed and the pressure thereby maintained in the brake cylinder, any departure from the pressure then exerted by the standard spring G will act to open one or the other of the two valves according as the departure is an increase or a decrease. Remembering that the tension of the spring G is opposed by the train-line pressure in the chamber 3 plus the brake-cylinder pressure in chamber 4, it will be readily understood that a decrease of the train-line pressure will allow the diaphragms to rise under the action of the standard spring G and thereby open valve $k'$, admitting more air to the brake cylinder, while, conversely, any increase in the train-line pressure will cause the depression of the diaphragms against the force of the spring G and thereby open valve $k^2$ and so release the brake-cylinder pressure by allowing the air to escape through the exhaust. It will thus be recognized that my present arrangement embodies in a simple and effective manner the principle set forth in my fundamental patent aforesaid No. 768,537.

In practice the parts will be assembled, as shown in Fig. 2, the section $a^2$, with the diaphragms on either side of it joined by their hollow stem, being inserted between the sections $a'$ and $a^3$, the latter carrying the valves K and P and the three sections being then joined together by the bolts. Then, air pressure being applied, the tension of the spring G (which is already under tension by the confining effect of the stops $d$, $d$) will be adjusted by means of the screw H until at the given train-line and auxiliary pressures the two valves $k'$ and $k^2$ will be securely seated and the adjusting screw H then permanently locked. This, it will be noticed, involves but one adjustment for the entire apparatus, this adjustment not only acting upon valves $k'$ and $k^2$ but also upon spring G. That is to say, the screw H will be first turned so as to lift both valves from their seats and then retracted to first seat the valve $k'$ and then further adjusted to seat the upper end of the hollow diaphragm stem against the valve $k^2$. This adjustment for the valves will also be the adjustment for the spring G. The manifold advantages of this arrangement from a practical point of view are obvious. The valve P, which will be referred to later, requires no adjustment, its proper action being merely dependent on dimensions which are fixed in the course of manufacture.

I come now to the feature of construction by which the train-pipe air enters and supplies the auxiliary reservoir and at the same time permits the brakes to act suddenly and powerfully upon sudden and extreme reductions in the train-line pressure. P is a check-valve consisting of a valve-disk of considerable area seated upon and closing a large port between the chamber 1 and the chamber 6 and provided with a vertical hollow stem passing upward through the top wall of the chamber 6 and entering the chamber 8, which is in communication with the auxiliary reservoir and also in communication with the bore of the hollow valve stem by means of ports $p$ in the annular walls of the stem. Similar ports $p'$ also bring the chamber 6 into communication with the bore of the hollow valve-stem when the valve is in its lowermost position as shown in Fig. 2. When, however, the valve is lifted, the ports $p'$ are closed by the wall of the partition which separates chambers 6 and 8. There is, however, a small feed-groove $p^2$ passing through the annular wall of the valve stem below the aforesaid ports $p'$ which is not closed by the lifting of the valve, but remains as a permanent means of communication between chamber 6 and the interior of the valve-stem and thereby with the chamber 8 and the auxiliary reservoir. It will be understood that the valve P will be lifted whenever the train-line pressure existing in chamber 1 exerts an upward force on the valve greater than the downward force exerted by the auxiliary pressure in chamber 6. This will serve to maintain the supply of air in the auxiliary reservoir by the lifting of the valve in the event of the pressure behind it being depleted and the pressure thus communicated from the train line to chamber 6 will also be communicated to the auxiliary reservoir through the feed groove $p^2$, which is always open. Assume, however, that an emergency application is desired and a sudden reduction in train-pipe pressure is made by the engineer. The effect of this will be to reduce the downward pressure on the diaphragms in chamber 3 and permit the spring G to lift the valve stem K and throw the inlet valve $k'$ wide open. Chamber 6 will then immediately empty itself into the brake cylinders through chamber 5 and thereby so reduce the downward pressure on valve P that it will be thrown wide open by the train-line pressure beneath it, permitting the train-line air to flow into the brake cylinders through chambers 6 and 5, the connection with the auxiliary reservoir through the ports $p'$ being simultaneously shut off. This will give an initial rush of train-line air into the brake cylinder ahead of any inflow thereto of the auxiliary air. When valve P is thus lifted the upward train-line pressure thereon will act on a larger area than the downward auxiliary air pressure and so tend to maintain the valve in its elevated position. But as the train line becomes depleted, by this flow of air therefrom into the various brake cylinders, the valve P will drop and close, thus putting the auxiliary reservoir into communication once more with the chamber 6, so that the application of the brakes will then be completed and maintained by the flow of air thereto from the auxiliary reservoir, following the aforesaid inflow of train-line air. Therefore, the brake-cylinder pressure having been produced by air from the train pipe, in the first instance, the drain on the supply of air in the auxiliary reservoir is much less and its subsequent available pressure is correspondingly higher, because the loss of pressure in the auxiliary reservoir, ordinarily due to the expansion of its supply into the added volume of the brake-cylinder according to the relative volumes of said cylinder and reservoir when the brake-cylinder is empty, is obviated. The auxiliary reservoir is required only to supplement the brake-cylinder pressure first produced by the train line air, and this results in maintaining the auxiliary reservoir pressure at higher points during the entire range of brake application and maintains a consequent greater force exerted by the brakes during their application. Moreover, the flow of train-line air into the brake cylinders serves to still more rapidly reduce the train-line pressure upon which reduction the application depends. In the case of ordinary or service applications the valve P will be opened to a small degree, or not at all, and the brake cylinders will be supplied almost wholly from the auxiliary reservoir, or entirely so if the application is not sufficiently sudden to cause the lifting of the valve P, which then serves merely as a feed device for supplying air to the auxiliary reservoir from the train line. Thus after the brakes have been applied at the expense of more or less auxiliary reservoir air, the restoration of train-line pressure to release them will lift valve P against the now diminished auxiliary pressure and train-line air will flow into and restore the auxiliary pressure through the feed port $p^2$.

Referring to the next feature of my invention, to-wit, the maintaining of an auxiliary-reservoir pressure greater than the train-line pressure during periods of brake application, it will be remembered that in the ordinary air-brake system heretofore employed there is maintained a balance of train-line pressure against auxiliary pressure at all times; and that the brake pressure is obtained at the expense of the auxiliary pressure by reason of air flow from the auxiliary reservoir into the brake cylinder in response to reduction in train-line pressure. In other words, the three pressures must come to an equality when the brake pressure is at its maximum and the train-line pressure at its minimum, and the maximum brake pressure therefore corresponds to the minimum train-line pressure. It is my purpose to change this arrangement by maintaining, during the period of brake application, an auxiliary-reservoir pressure which will be materially greater than the train-line pressure, by which I accomplish two things: First, I secure a greater range of brake pressure, since the maximum brake pressure cannot now fall to the minimum degree of train-line pressure, and, second, the leakage in the brake cylinder is supplied from the auxiliary reservoir instead of from the train line, so that such leakage does not act to further reduce the train-line pressure and thereby affect the tension on the brakes during applications less than the maximum. Moreover the maximum brake pressure will be maintained in spite of such leakage, since there is still a reserve pressure in the reservoir greater than the brake pressure upon which the brake cylinder may automatically draw. This result I accomplish by employing my system heretofore described, by which the brake pressure is determined by a balance of that pressure and the train line pressure against a standard pressure, and by which the auxiliary reservoir pressure is held in reserve during the initial operation of the brakes, and in addition I provide such a ratio of the auxiliary reservoir capacity to the brake cylinder capacity that the draft of the brake cylinder upon the auxiliary reservoir pressure may permit the latter pressure to be always maintained at a point higher than the train line pressure during the brake application periods.

Referring to Figs. 3 and 4, the former figure indicates diagrammatically the pressure relations in the prior brake system and the latter figure the corresponding relations in my system. In both figures, pressure in pounds is indicated at the left along the vertical ordinate line, while the abscissa line indicates the time required to apply the brake to the maximum point of pressure, the value of that time being, however, immaterial to the present matter. It is also assumed that the auxiliary-reservoir pressure, during periods of brake release, is 70 pounds and the brake pressure at the same time is zero.

In Fig. 3 the line Y represents the drop of both auxiliary pressure and the train-line pressure produced by the application of the brakes, and the line X represents the increase in brake pressure thereby produced. These lines meet at the point S, representing about 52 pounds, which is then the pressure, not only of the brake cylinders, but also of the auxiliary reservoir and the train line, the three meeting at that common point.

Referring to Fig. 4, the line Y represents the drop of train-line pressure, just as in Fig. 3, but, by the means described, the auxiliary-reservoir pressure follows a different line, to-wit, the line Z, which indicates a lesser drop and is also materially higher than the line Y. In this case the line of brake pressure X intersects the line Z at the point $S^2$ which in this case is 60 pounds. This means that, with about the same drop in train-line pressure, the maximum brake pressure in my system will be 60 pounds as against 52 in the prior system. Moreover, any leakage in the brake cylinders will be supplied from the auxiliary-reservoir in which the pressure remains at 60 pounds, instead of from the train line, wherein the pressure has dropped to 50 pounds and this superiority of auxiliary-reservoir over train-line pressure exists at all points of the application period covering the lesser as well as the maximum brake pressures. Of course during the periods of brake relief the train-line pressure in my system will balance the auxiliary-reservoir pressure, just as in the former arrangement, but as the brakes are applied, will follow a line of more rapid decrease than that followed by the auxiliary-reservoir pressure. For, since during the initial application of the brakes, the auxiliary reservoir pressure is maintained constant, the train pipe pressure will diminish more rapidly in my system than in the Westinghouse system. This is shown by the lower line in Fig. 4 diverging from the 70-lb. pressure point. In view of the fact that the train line pressure is delivered directly to the brake cylinder, the pressure in the brake cylinder rises more rapidly and reaches a higher point more quickly in my system than in the Westinghouse system. This is shown by the line in Fig. 4 extending upward from the zero line. The three lines representing the auxiliary reservoir pressure, the train line pressure, and the brake cylinder pressure, are shown as having an angle which represents the point at which the valve P closes, admitting air from the auxiliary reservoir to the brake cylinder, instead of from the train line, as indicated in Fig. 4. From this point on the auxiliary reservoir pressure diminishes, while the train pipe pressure diminishes less rapidly than it did at the initial operation of the triple valve before the valve P closed. Since, after the closing of the valve P the brake cylinders are supplied from the auxiliary reservoir, the line representing the pressure in the latter converges with the brake cylinder pressure line, where the pressures in the three passages are in equilibrium. The auxiliary reservoir and brake pressure is therefore ultimately considerably above that produced in the Westinghouse system, while the train line pressure is considerably below that of the Westinghouse system. In Fig. 4 the lines extending from the angles at the second ordinate line represent that portion in the range of the brake application where the system acts substantially as in my prior Patent No. 768,537, but is at a higher brake pressure, since the reservoir pressure has been reserved. I may add that of the two advantages above mentioned resulting from this feature of my invention, that relating to the greater capacity cannot be realized in a train equipped partly with my brakes and partly with those of the prior system referred to, unless such train is equipped with an engineer's valve suitable for my system, when the advantage in question will be secured in those cars equipped with my system without detriment to those equipped with the former system.

What I claim is—

1. In a triple valve for air brakes two tandem connected valves serving respectively as the inlet and exhaust valves for the brake cylinder, combined with operating devices therefor controlled by the resultant of the train-line and brake-cylinder pressures acting in opposition to a standard pressure.

2. In a triple valve for air brakes two valves mounted on a common stem and serving respectively as the inlet and exhaust valves of the brake cylinder, combined with operating devices controlled by the resultant of the train-line and brake-cylinder pressures acting in opposition to a standard pressure.

3. In a triple valve for air brakes, two spherical valves mechanically connected and serving respectively as the inlet and exhaust valves of the brake cylinder, combined with operating devices therefor controlled by the train-line and brake-cylinder pressures acting in opposition to a standard pressure.

4. In a triple valve for air brakes, two tandem connected valves serving respectively as the inlet and exhaust valves of the brake cylinder, combined with operating devices therefor controlled by the train-line and brake-cylinder pressures acting in opposition to a standard pressure and operating the two valves in succession, the opening of either valve being preceded by the closing of the other.

5. In a triple valve for air brakes, two mechanically connected valves operating in line, one with the other, and serving respectively as the inlet and exhaust valves of the brake-cylinder, combined with a common operating device therefor controlled by the resultant of the train-line and brake-cylinder pressures acting in opposition to a standard pressure.

6. In a triple valve for air brakes, two spherical valves mounted on a common stem and serving respectively as the inlet and exhaust valves of the brake cylinder, combined with a stationary seat for one valve and a movable seat for the other, the said movable seat serving also as the operating agency for the valve having a stationary seat.

7. In a triple valve for air brakes the combination with the inlet and exhaust valves of the brake cylinder, of operating devices therefor comprising two diaphragms exposed on their adjacent surfaces to the train-line pressure and on their outer surfaces to the brake-cylinder pressure and a standard pressure respectively.

8. In a triple valve for air brakes the combination with inlet and exhaust valves of the brake cylinder, of operating devices therefor consisting of diaphragms of differing areas, the larger area being subjected to train-pipe pressure and the smaller area to brake-cylinder pressure and both subjected to the action of a standard pressure.

9. In a triple valve for air brakes, the combination with the inlet and exhaust valves of the brake cylinder both being provided with spherical seating surfaces of an operating diaphragm therefor, and a spring acting upon said valves through spherical bearings.

10. In a triple valve for air brakes, the combination with the inlet and exhaust valves of the brake cylinder mounted on a common stem, of a stationary seat for the inlet valve, a movable perforated seat for the exhaust valve, and operating devices applied to the said movable and perforated seat.

11. In a triple valve for air brakes, the combination with the inlet and exhaust valves of the brake cylinder, of operating devices therefor comprising two parallel diaphragms forming opposite sides of a closed chamber communicating by a branch passage with the train line, one diaphragm also forming one side of a closed chamber in communication with the brake cylinder, an auxiliary reservoir communicating by a second branch passage with the train line, and a source of standard pressure applied to both diaphragms.

12. In a triple valve for air brakes, the combination with the inlet and exhaust valves of the brake cylinder, of a stationary seat for one valve, a movable seat for the other valve and adjusting devices applied to the said movable seat.

13. In a triple valve for air brakes the combination with the inlet and exhaust valves of the brake cylinder of a common adjusting device for those valves.

14. In a triple valve for air brakes the combination with the inlet and exhaust valves of the brake cylinder of an operating spring and adjusting devices for both valves applied thereto through the said spring.

15. In a triple valve for air brakes the combination with the inlet and exhaust valves for the brake cylinder with an operating spring therefor and an adjusting device common to the said spring and two valves.

16. In a triple valve for air brakes the combination with inlet and exhaust valves for the brake cylinder, of controlling devices therefor dominated by the train line and brake cylinder pressures acting in opposition to a standard spring, and a casing for the spring provided with a stop for holding the spring under tension and with devices for adjusting that tension.

17. In a triple valve for air brakes wherein the inlet and exhaust valves of the brake cylinder are controlled by the train line and brake cylinder pressures acting in opposition to a spring, a separable casing for the spring provided with a stop for holding the spring under tension.

18. In a triple valve for air brakes the combination with the inlet and exhaust valves of the brake cylinder, of controlling diaphragms and spring therefor, an external casing, a separable casing for the spring having a stop for maintaining the spring under tension, and adjusting devices for the spring.

19. In a triple valve for air brakes, the combination with inlet and exhaust valves for the brake cylinder, of controlling diaphragms therefor, exposed to the brake cylinders and train line pressures and also to a spring pressure, and a sectional casing having the sections separated by the diaphragms and one of the said sections containing the spring aforesaid with spherical bearings between the spring and the diaphragms.

20. In a triple valve for air brakes, the combination with inlet and exhaust valves of the brake cylinder mounted on a common stem of two diaphragms connected by a stem in line with the said valve stem and an operating spring acting in line with the said valves.

21. In a triple valve for air brakes, the combination with the valve stem K having the spherical valves $k'$ $k^2$ mounted thereon of the diaphragms C and D transverse to the said valve stem, the hollow connection E, and a spring G in line with the said valve stem and acting thereon through a spherical joint.

22. In a triple valve for air brakes the combination with a sectional casting of diaphragms interposed between the said sections and forming the opposite sides of a chamber communicating with the train line, a source of standard pressure, connections to the brake cylinder communicating with a chamber closed on one side by one of the diaphragms aforesaid, and inlet and exhaust valves for the brake cylinder controlled by the train-line and brake-cylinder pressures acting in opposition to the said standard pressure.

23. In an air brake system the combination with the inlet and exhaust valves of the brake cylinder, of operating devices therefor controlled by the resultant of the train-line and brake-cylinder pressures acting in opposition to a standard pressure, and means controlled by the train-line pressure for admitting train-line air to the brake cylinders through the inlet valve aforesaid.

24. In an air brake system the combination with the inlet and exhaust valves of the brake cylinder, operating devices therefor controlled by the resultant of the train-line and brake cylinder pressures acting in opposition to a standard pressure, and means controlled by the train-line pressure for admitting train-line air to the brake cylinder in advance of the admission thereto of air from the auxiliary reservoir.

25. In an air brake system a triple valve containing two chambers, one communicating with the brake cylinder and the other adapted to communicate with the train line and the auxiliary reservoir alternately, an inlet valve between the said chambers, operating devices for said valve controlled by the train-line pressure and the brake-cylinder pressure acting in opposition to the standard pressure, and means for connecting the last mentioned of the two chambers aforesaid with the train line and the auxiliary reservoir alternately.

26. In an air brake system, the combination with the inlet and exhaust valves of the brake cylinder, of operating devices therefor controlled by the resultant of the train-line and brake-cylinder pressures acting in opposition to a standard pressure, and means controlled by the train-line pressure for admitting train-line air and auxiliary-reservoir air to the brake cylinder in succession.

27. In an air brake system, a triple valve provided with connections to the train-line and auxiliary-reservoir and having inlet and exhaust valves for the brake cylinder controlled by the resultant of the train-line and brake-cylinder pressures acting in opposition to the standard pressure, combined with means for supplying the auxiliary reservoir from the train-line, and a valve for diverting the train-line air to the brake cylinder.

28. In an air brake system a triple valve containing inlet and exhaust valves for the brake cylinder controlled by the resultant of the train-line and brake-cylinder pressures acting in opposition to the standard pressure and a valve controlled by the differential pressure of the brake-cylinder and train-line for diverting train-line air to the brake cylinder.

29. In an air brake system, a triple valve having a chamber normally in communication with the auxiliary reservoir and communicating with the brake cylinder through a valve controlled by the resultant of the train-line and brake-cylinder pressures acting against the standard pressure, and provided with means under control of the train-line pressure for connecting the said chamber with the train line and disconnecting it from the auxiliary reservoir.

30. In an air brake system, a triple valve containing in combination inlet and exhaust valves for the brake cylinder controlled by the resultant of the train-line and brake-cylinder pressures acting in opposition to the standard pressure, and the diverter valve P acted upon unequally by the train-line and auxiliary-reservoir pressures for admitting the train-line pressure to the brake-cylinder in advance of the admission of the auxiliary-reservoir air thereto.

31. In an air brake system, a triple valve containing a chamber 6, a valve between said chamber and the brake cylinder controlled by the resultant of the train-line and brake-cylinder pressures acting in opposition to a standard pressure, means for putting the said chamber in communication with the auxiliary reservoir, and means controlled by the train-line pressure for putting the said chamber in communication with the train line.

32. In an air brake system, the combination with the inlet valve for the brake cylinder, of operating devices therefor controlled by the resultant of the train-line and brake-cylinder pressures acting in opposition to a standard pressure, and a second valve for admitting train-line pressure to the said brake-cylinder under control of the train-line pressure.

33. In an air brake system, a triple valve containing a diverter valve P adapted to put the train line in communication with the auxiliary reservoir when the pressure in said reservoir falls below the train-line pressure and to put the train line in communication with the brake cylinder upon a sudden decrease in train-line pressure.

34. In an air brake system, the combination with an auxiliary reservoir and train-line, of means for delivering the air from said reservoir to the brake cylinders upon a decrease in the train-line pressure, while maintaining the reservoir pressure at a point higher than the train-line pressure.

In witness whereof I have hereunto set my hand before two subscribing witnesses this 21st day of February, 1907.

JAMES F. McELROY.

Witnesses:
BEULAH CARLE,
ERNEST D. JANSEN.